United States Patent
Zirilli et al.

(10) Patent No.: US 7,957,657 B2
(45) Date of Patent: Jun. 7, 2011

(54) UNIVERSAL MODULE FOR ENABLING MEASUREMENTS ON COLOR PRINTERS

(75) Inventors: Francisco Zirilli, Penfield, NY (US);
Jerry F. Adams, Waterport, NY (US);
Augusto E. Barton, Webster, NY (US);
Paul S. Bonino, Ontario, NY (US);
Derek A. Bryl, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 92 days.

(21) Appl. No.: 12/369,852

(22) Filed: Feb. 12, 2009

(65) Prior Publication Data

US 2010/0201061 A1    Aug. 12, 2010

(51) Int. Cl.
*G03G 15/00* (2006.01)

(52) U.S. Cl. ............ 399/49; 399/15; 271/275; 382/112

(58) Field of Classification Search ............ 271/275, 271/277, 193–197, 204; 382/112; 399/49, 399/15
See application file for complete search history.

(56) References Cited

U.S. PATENT DOCUMENTS

| | | | |
|---|---|---|---|
| 3,028,502 A * | 4/1962 | Schiffbauer et al. | 356/629 |
| 3,174,748 A * | 3/1965 | Roberts et al. | 271/8.1 |
| 3,278,754 A | 10/1966 | Wallace | |
| 3,595,563 A | 7/1971 | Rostoker et al. | |
| 3,804,401 A * | 4/1974 | Stange | 271/313 |
| 4,277,177 A | 7/1981 | Larsen et al. | |
| 4,552,448 A | 11/1985 | Davidson | |
| 4,685,139 A * | 8/1987 | Masuda et al. | 382/112 |
| 4,997,178 A | 3/1991 | Ogoda | |
| 5,125,037 A * | 6/1992 | Lehtonen et al. | 382/112 |
| 5,144,566 A * | 9/1992 | Anderson et al. | 382/112 |
| 5,183,251 A | 2/1993 | Sardella | |
| 5,344,133 A | 9/1994 | Jantsch et al. | |
| 5,467,180 A | 11/1995 | Malachowski et al. | |
| 5,526,028 A | 6/1996 | Rottman | |
| 5,537,615 A * | 7/1996 | Kelly | 382/270 |
| 5,642,189 A | 6/1997 | Alguard | |
| 5,732,632 A * | 3/1998 | Oomoto et al. | 101/483 |
| 5,774,635 A * | 6/1998 | Kuusisto et al. | 358/1.6 |
| 6,175,700 B1 | 1/2001 | Miller et al. | |
| 6,192,140 B1 * | 2/2001 | Reinhard et al. | 382/112 |
| 6,223,585 B1 * | 5/2001 | Krogstad | 73/32 R |

(Continued)

FOREIGN PATENT DOCUMENTS

JP    60-40372 A    3/1985

(Continued)

*Primary Examiner* — Stefanos Karmis
*Assistant Examiner* — Luis Gonzalez
(74) *Attorney, Agent, or Firm* — Pillsbury Winthrop Shaw Pittman LLP

(57) ABSTRACT

A measurement module for a printer generally includes a page diverter mechanism configured to selectively divert a sheet of media from a main media path to a module media path; a rotating drum configured to receive the media from the module media path and to affix the media on an outer surface of the drum; a measuring device spaced adjacent to the drum and configured to measure as aspect of the media affixed to the surface of the drum; and a sheet transport configured to remove the media from the drum. According to one embodiment, the module may include a drum with an electrostatic hold-down mechanism that captures a sheet and an axially translating measuring device that is configured to read the entire surface as the drum rotates. The measurement module also allows the printed media to cool to eliminate problems with color measurements due to thermo chromaticity.

19 Claims, 2 Drawing Sheets

U.S. PATENT DOCUMENTS

| | | |
|---|---|---|
| 6,621,576 B2 | 9/2003 | Tandon et al. |
| 6,845,288 B2 * | 1/2005 | Pierel et al. ............... 700/194 |
| 6,961,526 B2 * | 11/2005 | Tezuka et al. ............... 399/15 |
| 6,975,949 B2 | 12/2005 | Mestha et al. |
| 7,631,863 B2 * | 12/2009 | Forch et al. ............... 271/204 |
| 7,659,984 B2 * | 2/2010 | Schaede ............... 356/429 |
| 2003/0094751 A1 | 5/2003 | Takei |
| 2004/0075213 A1 | 4/2004 | Obama et al. |
| 2007/0216087 A1 | 9/2007 | Matsudaira et al. |
| 2010/0084804 A1 | 4/2010 | Zirilli |
| 2010/0084809 A1 | 4/2010 | Zirilli et al. |
| 2010/0123780 A1 * | 5/2010 | Wiebe ............... 348/160 |

FOREIGN PATENT DOCUMENTS

| | | |
|---|---|---|
| JP | 1-092150 A | 4/1989 |

* cited by examiner

UNIVERSAL MODULE FOR ENABLING MEASUREMENTS ON COLOR PRINTERS

FIELD

This application relates to systems and methods for enabling measurements of printed media on color printers.

BACKGROUND

Rendering specific colors from color printing systems can vary over time, and sometimes within a single job. In addition, environmental conditions, such as humidity and temperature, greatly affect toner and a particular system's print capabilities. The degree to which a particular color can vary and still be acceptable can differ based on a number of factors, such as, for example, the requirements of the customer, the specific job being printed, the print shop handling the print job, the specific color being printed, etc. Print shops that require a high degree of color fidelity typically inspect the printed job output at some specified interval. These inspections are often visual, but may also include measurement devices.

FIG. 1 shows a schematic illustration of a xerographic printing system 100, such as the Xerox Corp. iGen4® Digital Production Press. The print system 100 includes a source of paper or printable substrates 102 that is operatively connected to a printing engine 104, and output path 106 and finisher 108. As illustrated, the print engine 104 is a multi-color engine having a plurality of imaging/development subsystems 110 that are suitable for producing individual color images (e.g., CMYK) on belt 114, where the belt then transfers the images to the substrate.

Presently color spectral measurements in the iGen4® are made with the an in-line spectrophotometer (ILS) 120 mounted on the main paper path located in the output path 106. Because of this configuration, the customer typically has to run a dedicated print job to make spectral measurements, which requires additional print time and reduces efficiency.

In addition, in conventional printers where the ILS measures the ink/toner only a few seconds after fusing, this may result in inaccurate color measurements due to a phenomenon known as thermo chromaticity. Thermo chromaticity is a change in perceived color of an ink or toner as it changes temperature. Because of the fuser device in printers, prints are warm to touch as they are generated in a copier/printer and take some time (e.g., 10s to 100s of seconds) to cool to room temperature after they are printed.

The temperature of the ink or toner of prints has been measured as much as 110-120° F. As the ink/toner cools to room temperature (approximately 70° F.), its color may noticeable change. Color shift has been measured as much as 6 delta-E 2000.

SUMMARY

According to one embodiment, a measurement module for a printer includes: a page diverter mechanism configured to selectively divert a sheet of media from a main media path to a module media path; a rotating drum configured to receive the media from the module media path and to affix the media on an outer surface of the drum; a measuring device spaced adjacent to the drum and configured to measure as aspect of the media affixed to the surface of the drum; and a sheet transport configured to remove the media from the drum.

According to another embodiment of the application, a method for making inline spectral measurements in a printer includes: diverting a sheet of media from the main media path of a printer to a module media path; receiving the media from the module media paper and affixing it to the surface of a rotating drum; measuring an aspect of the media affixed to the rotating drum; and removing the media from the drum.

Other features, and advantages of one or more embodiments of the present application will seem apparent from the following detailed description, and accompanying drawings, and the appended claims.

BRIEF DESCRIPTION OF THE DRAWINGS

Embodiments of the present application will now be disclosed, byway of example only, with reference to the accompanying schematic drawings in which corresponding reference symbols indicate corresponding parts, in which.

DETAILED DESCRIPTION

A module is provided having components for making measurements of print media. The module may be located either before or after the output module, separate from the ordinary media path, in a printing system. The module includes at least one measuring device. The measurement module also allows the printed media to cool to eliminate problems with color measurements due to thermo chromaticity.

Test patterns and/or other diagnostic sheets may be interleaved with the print job and separated from the print job via the module. This enables periodic sampling of colors while a job is printing, allowing the customer to monitor color quality during production. Thus, the entire operation can occur while a print run is being made, thereby increasing the efficiency of printing.

Figure 2:
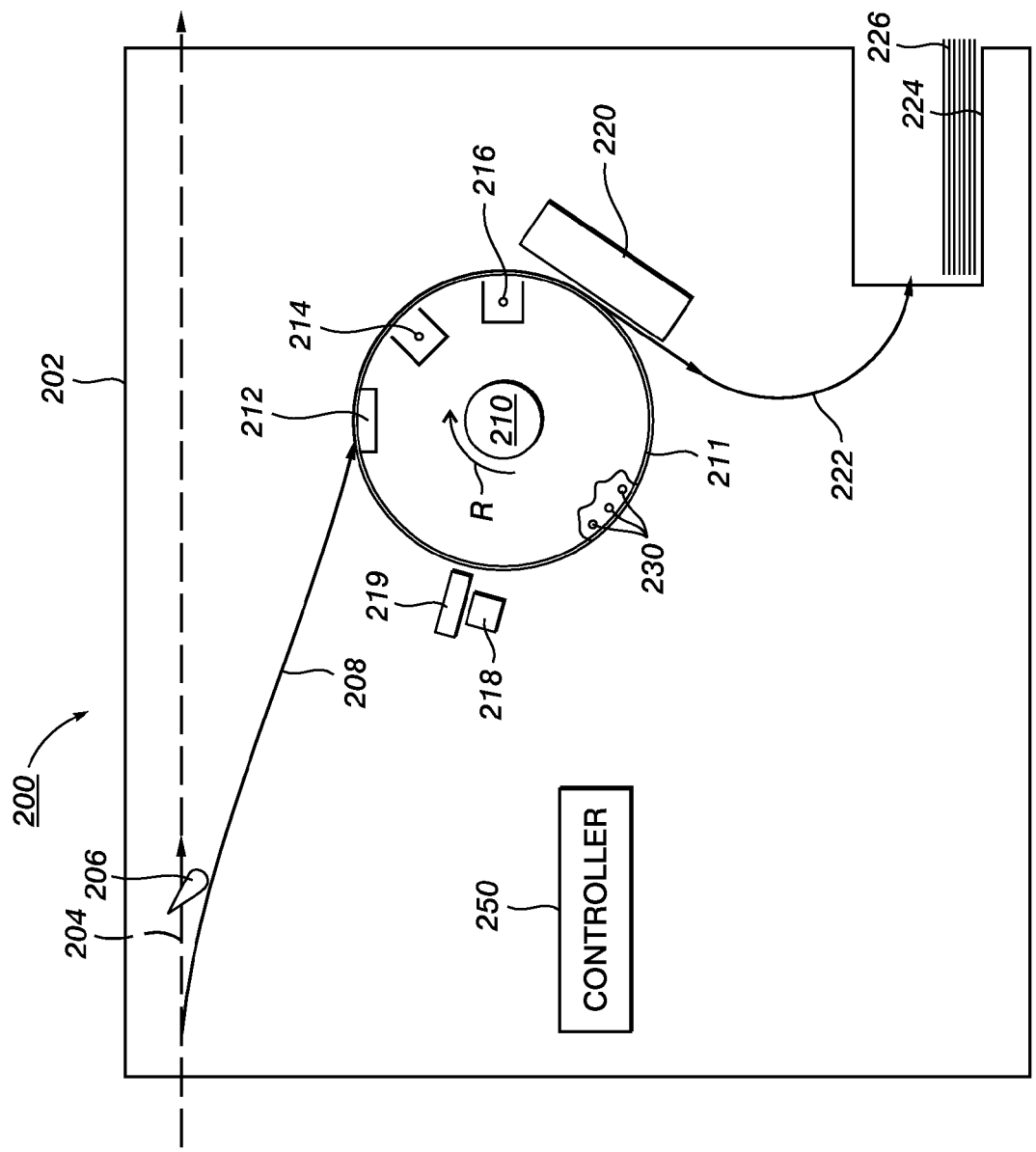
FIG. 2 shows an exemplary measurement module, according to an embodiment.

FIG. 2 shows an exemplary measurement module 200, according to an embodiment.

Figure 1:
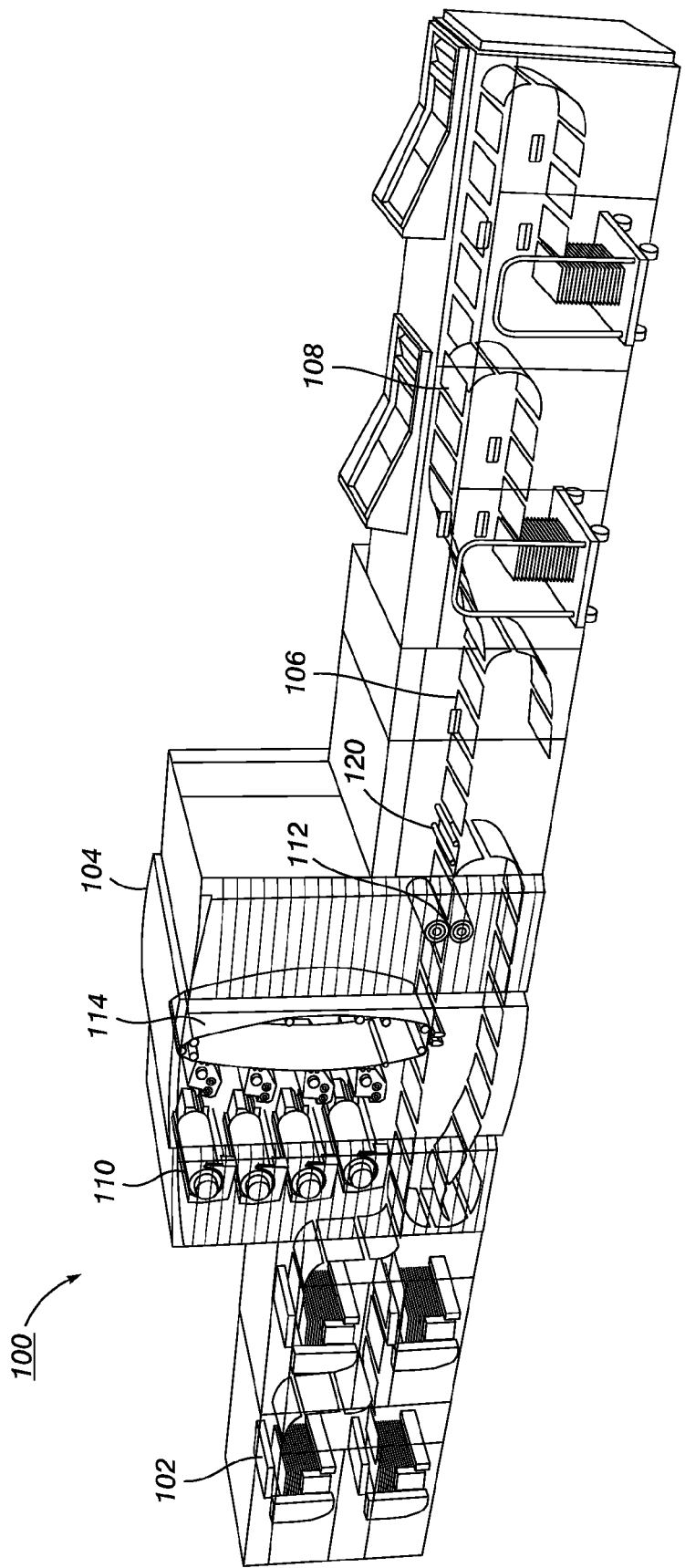
FIG. 1 shows a schematic illustration of a typical xerographic printing system which may include an in-line full-width array spectrophotometer.

The measurement module 200 may include a frame or housing 202 which supports the various elements discussed herein. In one implementation, the module 200 may be used in conjunction with printer, such as, the Xerox Corp. iGen4® Digital Production Press or similar print system (See FIG. 1). However, it will be appreciated that the module 200 may be similar used with any print system, such as, for example, xerographic, ink-jet (bubble jet), laser, offset, solid-ink, dye sublimation, etc. Thus, any reference to the Xerox Corp. iGen4® Digital Production Press herein is not to be construed as limiting.

Paper or other printed media may be diverted from a main paper path 204 and enters the module 200 via a page diverting mechanism 206. The page diverting mechanism 206 may be a gate mechanism or other mechanical device (e.g., air jets, belt, conveyer, or the like) for selectively diverting sheets of paper or media from the main paper path 204 to the module paper path 208.

The diverted sheet is then fed to a rotating drum 210 which secures the lead edge (LE) of the paper with a gripper mechanism 212. One exemplary gripper mechanism that may be used is disclosed, for example, in U.S. Pat. No. 4,552,448, herein incorporated by reference in its entirety.

The drum 210 may rotate in the clockwise direction R with a surface velocity approximately equal to the process speed of the print engine, so as not require a change in velocity of the sheet. Although, it may be possible in some implementations, for the velocity of the drum to be different than that of the print engine. For example, an accelerator/decelerator mechanism (not shown) may be positioned along on path 208 to ensure that velocity of the printed sheet corresponds to that of the drum.

The drum 210 may be sized so as to have a circumference that approximates the length of a sheet of paper in the process direction (i.e., the direction the sheet moves in). In other implementations, the circumference of the drum 210 might be large another to accommodate a plurality of sheets.

The paper may be tacked or affixed to the drum surface 211. This provides a smooth flush surface for measuring. Various electrical or mechanical tacking mechanisms may be used.

In one implementation, an electrostatic hold-down mechanism may be used to create an electrostatic charge to electrostatically hold the sheet to the drum surface 211. The electrostatic hold-down mechanism may include an electrostatic tacking device 214 and/or an electrostatic detacking device 216. The tacking device 214 creates an electrostatic charge of the drum surface 211 to attract and secure a sheet thereto, while the detacking device 216 creates a neutralizing or opposite charge of the drum surface 211 so as to release and/or possibly repel the sheet from the drum surface 211.

In some embodiments, the electrostatic tacking and detacking functions may be performed by a single device with bipolar drive voltage so for instance, a positive drive voltage causes the sheet to be tacked to the drum, and negative drive voltage detacks the sheet from the drum. For example, the electrostatic hold-down mechanism may include a corotron device with a bipolar high voltage (HV) power source.

A corotron is a device which carries a very high voltage, for example, produced by the bipolar high voltage power source, to generate a positive or negative electrostatic charge on the drum surface 211. For example, the corotron device may include a pin corotron, wire corotron or dicorotron. Corona devices with grids, such as a scorotron, might also be possible. In fact, the grid may improve charge uniformity, if a greater level of control is desired.

Bipoloar voltage or current may be generated, for example, by stacking two power supplies together, a positive one and a negative one, with one supply enabled at a time. The unenabled supply may allow the voltage from the other, enabled supply to pass through its output shunt resistance. One example of a bipolar HV power supply that may be used, is the Detack power supply, which is used in the Xerox Corp. iGen3® and iGen4® Digital Production Presses, and capable of generating approximately +1500 to −4000 VDC at 0 to 75 uA current. Of course, other bipolar HV power supplies might also be used.

The voltage typically required to tack the sheet to the drum 210 may depend on various factors, including, but not limited to: the particular corona device chosen, the media dielectric properties and/or the media speed. In one implementation, the power supply may be capable of outputting ±5 KV at a current of about ±100 uA to the corotron for generating an electrostatic force sufficient for tacking printed sheets. The detacking function needs only to remove the charge on the drum surface 211, and that may done at a lower voltage of opposite polarity. Although, it will be appreciated that an opposite polarity charge could also be generated on the drum surface 211 to help repel the print media as well. In some implementations, the current may be the same magnitude for tacking and detacking.

Other media affixing devices could also be used. For example, a biased roll that directly charges the print media might be used. The voltage required for a biased roll device may be much lower than that required for a corona device, since the bias is directly applied to the paper. In another implementation, the surface of the drum surface 211 may include a plurality of holes connected to a vacuum (or low pressure) source that are arranged and configured to draw and hold the printed sheet onto the drum.

A measuring device 218 may be located a fixed distance from the drum surface 211. This distance may be the focal distance of the color measuring device 218 to the surface of the paper for optimal results. It will be appreciated that the measuring device 218 may be positioned at other locations with respect to the drum surface also (other than shown in FIG. 2). For example, the measuring device 218 may be positioned adjacent to the drum 210 upstream of the vacuum assist sheet transport. Also, plural measuring devices 218 may be possible.

The measuring device 218 may be a point or strip spectrophotometer or a full width array (FWA) spectrophotometer, for example, as disclosed in U.S. Pat. Nos. 6,621,576, and 6,975,949, incorporated herein by reference in their entireties. In other implementations, the measuring device 218 may be a colorimeter, a densitometer, a spectral camera, or other color sensing device. As the sheet passes across the measuring device 218, the measuring device 218 senses a surface of the sheet to detect or measure a property of the sheet of media. Properties measured may include, for example, one or more of: color, spectral measurements, density, gloss, differential gloss, registration, etc.

In one implementation, the measuring device 218 may be mounted on a translating stage 219 that moves the measuring device 218 in the "cross-process" direction along the width of the drum (i.e., into and out of the paper in FIG. 2). The translating stage 219 may be a linear actuator or ball-screw assembly. This configuration may be advantageous for a point or strip spectrophotometer which may not span the entire width of the drum 210.

Conventional printing system using an inline point or strip spectrophotometer typically only generate a columnar or strip shaped measurement profile of the media which does not span the width of the media. Moreover, in conventional printing systems test patterns and color patches had to be positioned and printed to correspond with the field of view of the fixed inline sensor.

By contrast, according to an embodiment, a measurement profile of the entire width of media may be obtained by moving the measuring device 218, along the cross-process direction, using the translating stage 219 and rotating the drum 210.

One or more modes for taking measurements with a point measuring device 218 and translating stage 219 may be used. For example: (1) by knowing the location(s) of test patterns or color patches, the measuring device 218 may be moved (just before measurement) to the location(s) using the translating device 219; (2) by step-wise rotating of drum 210 and translating the measuring device 218 at each step (e.g., back or forth); or (3) by continuously rotating the drum 210 multiple times and moving the measuring device 218 step-wise in the cross-process direction after each rotation of the drum 210. Of course, other modes are also possible.

The resultant measurement profile obtained, for example, by modes (2) or (3) may be similar to that of a full width array sensor. Full width array sensor are typically much more expensive than point or strip sensors. Therefore, a significant cost savings using a point sensor instead of a FWA sensor may be realized.

In addition, a page may be printed with various colors patches across its width to reduce paper usage. The page may also be printed with the same color across its width so that cross-process uniformity of the printer may be measured.

Typically, only a single pass of a point of a page in front of the measuring device 218 may be all that is required for a color or spectral measurements. However, it will be appreciated that the measurement module 200 also allows the opportunity for the rotating drum 210 to make multiple passes in front of the measuring device 218 with the same point. In one implementation, multiple measurements of the same point may be averaged for improved added accuracy.

After the data is collected by the measuring device 218, the detacking device 216 may be activated to neutralize the charge on the sheet so that a sheet transport 220 can remove the sheet from the drum surface 211. In one implementation, the sheet transport 220 may be a vacuum assist sheet transport which utilizes a vacuum (or the flow of low pressure air) to pull the sheet away from the drum 210 and onto a discharge path 222.

In another implementation, an electrostatic charge or air jets may be used to help remove the sheet of paper from the drum to the discharge path 222. The electrostatic charge or air jets may use the mechanisms that were used for affixing a paper to the drum with vacuum (for example, by reversing the voltage charge or flow of air). Other devices might also be similarly used for removing the sheet from the drum surface 211.

The discharge path 222 coveys the sheet to the discard tray 224 where they may be collected and stored. The customer may then discard or recycle the discarded sheets 226 which collect in the discard tray 224, as needed.

In some embodiments, the exit angle of the printed sheet may be controlled. For example, the tacking device may be located closely trailing the entrance point of the sheet, if desired. The detacking device may be positioned such it is closely leading the exit point of the printed sheet from the drum. If the entrance and exit angles are fairly close to a tangent to the drum, then a single tacking/detacking electrostatic device or roll with bipolar drive could be employed.

Since the module 200 is located outside of the main paper path 204 of the printer, the paper may remain in the module 200 for a relatively long time without interrupting printing of the customer job. This may allow for proper cooling time of the print to reduce or eliminate the negative effects, such as thermal chromaticity, on measurements.

According to a further embodiment, a cooling system may be provided for cooling printed sheets (e.g., to room temperature) prior to their measurement such that the measuring device 218 provides more accurate measurements of the printer output. In some implementations, the drum 210 and therefore, the printed sheet may be cooled by cooling element 230. For example, the cooling element 230 may be a thermal electric cooler (TEC) or other cooling device which uses a coolant fluid circulating within the drum 210 to remove heat from the surface 211 of the drum 210. Accordingly, more accurate measurements of the printed media may be taken.

In some embodiments, the module 200 may be configured to couple with a printing device. Thus, test patterns and/or other diagnostic sheets may be interleaved with print job and separated from the print job via the module 200. See, for example, U.S. Pat. No. 6,175,700, herein incorporated by reference in its entirety. This enables periodic sampling of colors while a job is printing, allowing the customer to monitor color quality during production. The frequency of the test patterns and/or other diagnostic sheets may be selected so as to permit sufficient time for sheets of media to be measured using module 200.

The entire operation may occur while a print run is being made, thereby increasing the efficiency of printing. For example, printed customers document sheets may be transported via the main paper path to a finisher (e.g., 108) bypassing the module 200. On the other hand, test patterns and other diagnostic sheets may be diverted to the module 200 for measurements and onto the discard tray 224. Feedback from the measuring device 218 may be used to control one or more parameters of the printer in an automated manner.

A controller 250 may be provided to control the various elements and sequence of operations of the module 200. In some implementations, the controller 250 may be dedicated hardware like ASICs or FPGAs, software (firmware), or a combination of dedicated hardware and software. For the different applications of the embodiments disclosed herein, the programming and/or configuration may vary.

The controller 250 may be configured to communicate with the print controller of a printer system. In one implementation, the module 200 may have an interface (I/F) that uses standard protocols, such as, for example, multiple feeding and finishing architecture (MFFA) or universal serial bus (USB) for communication with the printer system. Operation of the module 200 may be controlled using the print controller, which communicates with the module controller 250.

The term "media," as used herein, may include a sheet of paper, such as a standard 8½×11 inch letter paper, A4 paper, or 8½×14 inch legal paper. However, it will be appreciated that "media" may include other sizes and printable media types, such as, bond paper, parchment, cloth, cardboard, plastic, transparencies, film, foil, or other print media substrates. Any reference to paper is not to be construed as limiting.

In accordance with the disclosed embodiments, less down time, less sensing cost, and higher repeatability, reproducibility and accuracy (RRA), may be realized. In addition, the measurement module enables printed sheets to sufficiently cool before taking measurements to avoid problems with thermo chromaticity, which is not feasible in conventional in-line printing systems. The measurement module also permits calibration measurements to be made, even while printing large jobs.

While this disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the disclosure following, in general, the principles of the disclosure and including such departures from the present disclosure as come within known or customary practice in the art to which the application pertains, and as may be applied to the essential features hereinbefore set forth and followed in the spirit and scope of the appended claims.

What is claimed is:

1. A measurement module for a printer comprising:
   a page diverter mechanism configured to selectively divert a sheet of media from a main media path to a module media path, the diverted media having been printed upon by the printer and having an increased temperature due to printing;
   a rotating drum configured to receive the printed media from the module media path and to affix the printed media on an outer surface of the drum, the drum comprising a cooling unit configured to cool the printed media affixed to the surface of the drum;
   a measuring device spaced adjacent to the drum and configured to measure an aspect of the cooled printed media affixed to the surface of the drum; and
   a sheet transport configured to remove the media from the drum.

2. The module according to claim 1, wherein the drum rotates with a surface velocity approximately equal to the process speed of the printer.

3. The module according to claim 1, wherein the drum has a circumference that approximates the length of the sheet of media.

4. The module according to claim 1, wherein the drum comprising a gripper, and an electrostatic hold-down mechanism.

5. The module according to claim 1, further comprising:
a translating stage configured to move the measuring device in a cross process direction along the width of the drum.

6. The module according to claim 1, wherein the drum is configured to rotate multiple times to take measurements of the same point of a sheet of media.

7. The module according to claim 6, wherein the measurements are averaged together.

8. The module according to claim 1, wherein the sheet transport comprises a vacuum assist sheet transport which utilizes a vacuum or the flow of low pressure air to pull the sheet away from the drum and onto a discharge path.

9. The module according to claim 1, further comprising:
a controller configured to communicate with a print controller of the printer.

10. The module according to claim 1, further comprising:
a discard tray configured to store media.

11. A method for making inline spectral measurements in a printer comprising:
printing on a sheet of media by a printer, the temperature of the printed sheet being increased by printing;
diverting the printed sheet of media from the main media path of the printer to a module media path;
receiving the printed media from the module media paper and affixing it to the surface of a rotating drum;
cooling the printed media affixed to the surface of the drum;
measuring an aspect of the cooled printed media affixed to the rotating drum; and
removing the media from the drum.

12. The method according to claim 11, further comprising:
rotating the drum with a surface velocity approximately equal to the process speed of the printer.

13. The method according to claim 11, wherein the measuring comprises:
moving a measuring device in a cross process direction along the width of the drum.

14. The method according to claim 11, wherein the measuring comprises:
rotating the drum multiple times to take measurements of the same point of a sheet of media.

15. The method according to claim 14, further comprising:
averaging the measurements are together.

16. The method according to claim 11, further comprising:
printing one or more diagnostic or test patterns which are diverted for measurement.

17. The method according to claim 11, further comprising:
controlling one or more parameters of the printer based on measurements from the measuring device.

18. The method according to claim 11, further comprising:
transporting the media to a discard tray configured to store media.

19. A measurement device for a printer comprising:
a rotating drum configured to receive a sheet of media having been printed upon by the printer and having an increased temperature due to printing, the drum comprising a cooling unit configured to cool the printed media affixed to the surface of the drum; and
a measuring device spaced adjacent to the drum and configured to measure an aspect of the cooled printed media affixed to the surface of the drum.

* * * * *